3,583,030
APPARATUS FOR THE CONTINUOUS FORMING OF FIBROUS PRODUCTS BY CONTINUOUSLY COMPRESSING AND CURING BINDER CONTAINING FIBROUS MATERIAL
Rupert Douglas Terry, Toledo, George John Hannes, Maumee, and William Peter Hahn, Toledo, Ohio, assignors to Johns-Manville Corporation, New York, N.Y.
Application May 26, 1967, Ser. No. 641,494, now Patent No. 3,518,157, dated June 30, 1970, which is a continuation-in-part of application Ser. No. 485,754, Sept. 8, 1965. Divided and this application July 9, 1969, Ser. No. 856,874
Int. Cl. B29c 3/04, 15/00; B29d 27/00
U.S. Cl. 18—4                                                6 Claims

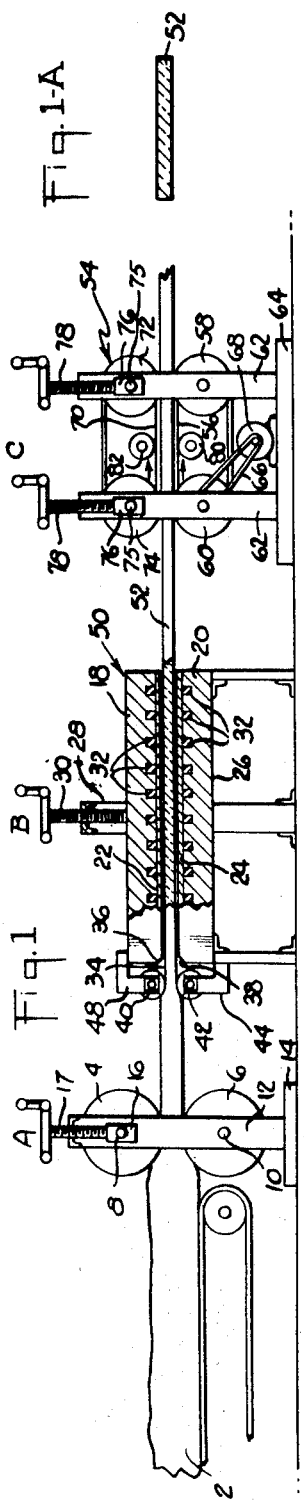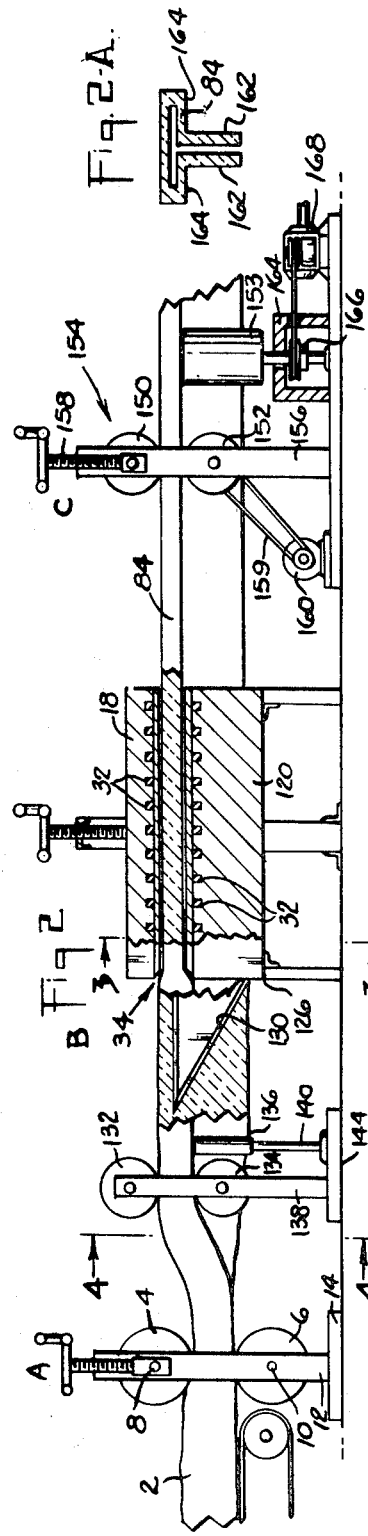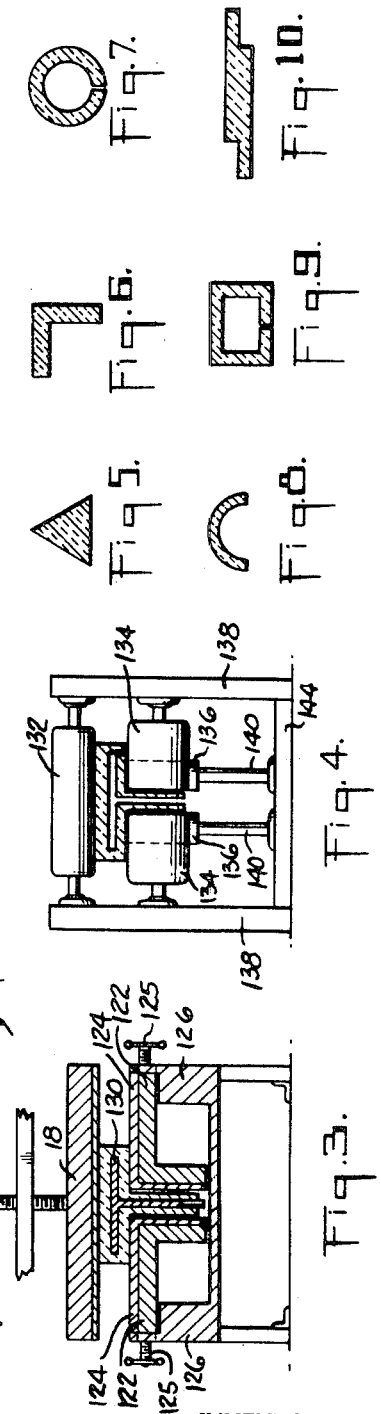

ABSTRACT OF THE DISCLOSURE

Continuous method of consolidating, shaping and setting a moving, low density loose mass of fibers containing binder throughout to produce permanently shape retaining, smooth surfaced products, comprising imparting to the fibers an initial compression and advancing the cure of the binder in the area adjacent the surfaces compressed, thereafter completing the compression to final density and configuration while ironing smooth the compressed surfaces and completing the cure of the binder throughout, and moving the mass of fibers through the aforesaid operations by applying a pulling force upon the emerging bonded product; and means therefor comprising, for example, in sequence the combination of opposing heated rollers and fixed opposing heated platens with a device for applying a mechanical pulling force.

RELATED U.S. APPLICATIONS

This application is a division of our copending application Ser. No. 641,494, filed May 26, 1967, now Pat. No. 3,518,157, which in turn is a continuation-in-part application of application Ser. No. 485,754, filed Sept. 8, 1965, and now abandoned.

BACKGROUND OF THE INVENTION

This invention relates to the manufacture of low density bonded fibrous products, and particularly to the forming and curing of loose masses of fibrous material containing throughout thermally activatable binder into coherent permanently shape retaining fibrous products of porous low density structure, but of substantially increased density over the initial loose fiber material, and of smooth flat surfaces. While this invention is primarily concerned with the manufacture of products from glass fibers, the means thereof are also applicable to fibrous materials of other comparable inorganic sources such as rock, slag and related siliceous fibers.

Conventional continuous forming of binder containing fibrous materials comprising bulky masses of loosely felted or intermeshed fibers having binder adhered thereto by means of consolidating and shaping the mass to a given density and configuration and then curing the binder, has generally been accomplished by confining and compressing the mass of fibrous material between opposing upper and lower conveyors which pass through relatively long curing ovens. During passage through the curing ovens, the opposing conveyors hold the compressed loose fibrous material to the imparted density and shape while hot air or other gases is passed through the porous body of the fibrous material to thermally activate the binder adhering to the fibers and secure the fibers to each other at locations of contact while under compression to permanently fix the imparted density and shape. An objectionable characteristic inherent in this forming system, which is especially pronounced and critical when the loose fibers are consolidated to a relatively high density and/or the product is destined for a use wherein appearance is a factor such as ceiling tile, is that the conveyors impart an undesirable rough finish on the contacted surfaces of the finished product attributable to the practical inability to achieve and maintain a near perfect plane with moving conveyor flights, particularly when operating under conditions of high temperatures. Also when the loose mass of fibers is compressed between opposing conveyors during passage through the curing oven to set the binder, the normal unsteadiness of the moving flights of the conveyor produces variations and give in the compression of the intermeshed fibers in contact with one another during the critical period of the setting of the binder adjoining them and results in a slight looseness or weakening of the bond formed at the fiber junctions.

The use of a stationary skid plate in such fiber forming systems has heretofore been proposed. For instance U.S. Pat. No. 2,997,096 to Morrison et al., which is directed to a fiber forming and curing system wherein the upper opposing conveyor or other compressing means is terminated intermediate the curing oven at a point when a partial cure of the binder within the fibers is sufficient to preserve the compression and shape of the product and thereafter the upper surface of the product is fully exposed to the hot gases accelerating the cure and reducing the length of the oven, discloses the use of an upper perforated stationary skid plate of intermediate oven length opposing the usual lower conveyor carrying the fibrous mass. However, this patent notes some of the drawbacks of the use of simply an upper stationary skid plate opposing a lower carrying conveyor for the confinement of the loose compressed fibers during curing of the binder, in particular the accumulated drag disrupting the surface fibers. Moreover from Morrison et al.'s disclosure that conveyor flight marking of the compressed fiber surface is eliminated by the use of a skid plate and the teaching of the use in all embodiments of a lower carrying conveyor to transport the loose mass of fibers through the compression and curing operations, it appears that some means of carrying the mass of loose unbonded fiber is required in such forming procedures.

SUMMARY OF THE INVENTION

This invention comprises a specific combination of sequential operations or steps, and means for carrying ou the same, which complement each other whereby the conjoint effect facilitates the manufacturing process and markedly enhances the product thereof in several significant properties. Specifically the invention constitutes improvements in a continuous method of consolidating, shaping and curing or setting a moving mass of loose, very low density fiber containing throughout a binder to produce permanently shape retaining, low density fiber products of increased strength and smooth flat surfaces which essentially comprises the sequence of steps of: imparting to the moving body of the very low density mass of loose fibers an initial compression and advancing the cure of the binder in the area of the fibers adjacent the surfaces compressed; thereafter completing the compression to final density and to final configuration while ironing smooth compressed surfaces and completing the cure of the binder throughout the mass of shaped fibers; and moving the mass of fibers through the aforesaid operations by applying a pulling force upon the emerging product. Also the invention includes apparatus therefor comprising in sequence the combination of opposing initial compressing and heating means such as rollers and opposing heated platens with means for applying a mechanical pulling force.

It is the principal object of this invention to provide an improved method and apparatus for consolidating, shaping and smoothing the surfaces of a mass of very low density loose fibers containing binder and thus permanently fixing the mass by curing the binder to produce a low density fibrous product of increased strength, smooth surface finish and of a variety of transverse cross-sectional configurations.

BRIEF DESCRIPTION OF THE DRAWING

The invention will be more fully understood and further objects and advantages thereof will become apparent when reference is made to the following detailed description of a preferred embodiment of the invention and the accompanying drawing in which:

FIG. 1 is a view in side elevation with parts in section and illustrating schematically a fibrous material production line embodying the inventive concepts of the instant invention;

FIG. 1-A is an end view of a fibrous product formed by the apparatus of FIG. 1;

FIG. 2 is a view in side elevation with parts in section and illustrating schematically another fibrous material production line embodying the inventive concepts of the instant invention;

FIG. 2-A is an end view of a fibrous product formed by the apparatus of FIG. 2;

FIG. 3 is a view in section taken on a plane passing through the line 3—3 of FIG. 2;

FIG. 4 is a view in section taken on a plane passing through the line 4—4 of FIG. 2; and FIGS. 5–10, inclusive, are end views illustrating the transverse cross-sectional configuration of various products which may be made in accordance with the instant invention.

DESCRIPTION OF THE PREFERRED EMBODIMENT

In accordance with the instant invention a low density mass of loose fibrous material containing resin binder is passed through a cooperating pair of opposed heated platens which function to impose and fix the compression and final shape during setting of the resin binder cure. Before passing through the platens, an initial set is given to the resin adjacent the surface areas of the fibrous mass by passing the loose fibrous mass between heated rollers. The fibrous mass leaves the heated platens as a fibrous product having a density substantially greater than the initial very low density of the resin containing fibrous material and having a permanent shape and relatively smooth surfaces on all areas contacted by the platens. The fibrous mass is pulled through the opposing fixed heated platens and the heated rollers by a pulling assembly acting on the surface of the produced fibrous product. Since the resin has been cured and set by the time the fibrous product reaches the pulling assembly, there is no marring of the surfaces of the fibrous product during the application of the pulling force.

The instant invention is particularly directed to the curing and shaping of resin binder containing fibrous materials comprising a mass of glass fibers having a density up to about 1.0 pound/cubic foot and containing dispersed throughout between about 3 and 25% of resinous binder material such as phenol formaldehyde resin binder. Such low density, loose masses of unset resin containing glass fibers have heretofore been considered as lacking in sufficient strength to enable it to be pulled through a compression forming and curing zone. Consequently, the curing and shaping of such fibrous masses has been accomplished by carrying the loose material on a conveyor belt passing through a curing oven wherein heated air was passed through the fibrous material to cure the binder. Applicants have discovered that by utilizing the inventive concepts of the instant application, they are able to pull a mass of resin containing fibers through a compression, shaping and curing zone. The mass of resin containing glass fibers is passed through the apparatus to form fibrous products having relatively low densities of between about 0.5 to 8.0 pounds/cubic foot and having any given transverse cross-sectional configuration. While the invention is particularly suited for use with resin binders which require heat to cure them, it is within the scope of the invention to utilize binders which will cure in any other manner while the binder containing fibrous mass is being pulled through a curing and shaping means.

Referring to the drawing, there is schematically illustrated in FIG. 1 a production line for producing a board type fibrous product having a generally rectangular transverse cross-sectional configuration from a loose low density mass of fibrous material containing resin binder. As illustrated in FIG. 1, a mass of resin containing fibrous material 2, which in the preferred embodiment of the invention comprises glass fibers, is produced and a suitable resin binder applied throughout, such as a phenol formaldehyde resin, by any conventional type of apparatus such as that illustrated in Labino, U.S. Pat. No. 3,129,084. In the first zone A of the apparatus of the instant invention, the loose fibrous mass of binder containing material is pulled through a pair of opposed rollers 4 and 6 which are mounted for free rotation in suitable bearing mounts 8 and 10. The bearing mounts 10 for the roller 6 are mounted in a fixed position on a pair of supports 12 secured to the base 14. The bearing mounts 8 for the roller 4 are adjustably mounted in the slots 16 in the supports 12 and may be adjusted toward and away from the roller 6 such as by the screw adjustment means 17 threadedly mounted in a portion of the support 12 as illustrated in FIG. 1. The roller 4 is positioned relative to roller 6 so that the proper amount of pressure may be applied to compress the loose fibrous mass 2 as it is pulled between the rollers 4 and 6. The mounting of the rollers 4 and 6 for free rotation allows these rollers to be rotated by the forces applied to the outer surface thereof by the fibrous material 2 as it passes therethrough.

The rollers 4 and 6 are also provided with suitable means, such as a gas or oil burner (not shown) mounted within each roller for controlling the temperature of the outer surface of the roller. If desired, other heating means such as electric resistance wires of a suitable nature may be used to control the temperature of the outer surface of each roller. The temperature of the outer surface of each roller is regulated to provide sufficient heat to advance the thermally activated binder in the areas adjacent the surface areas of the fibrous mass 2 contacted by the rollers 4 and 6 to a partially cured stage. At the same time, the fibrous mass is being compressed with the binder cure incited in the compressed surface areas, and this combined action functions to impart to the fibrous mass sufficient strength to withstand the pulling forces being applied thereto by the pulling means, to be explained below. The partial curing and compression of the loose fibrous mass 2 imparts some degree of dimensional stability to the fibrous mass while in the first zone A.

After leaving the first zone A, the fibrous mass 2 enters the second zone B for the curing of the resin in the fibrous mass to a final stage and for the forming of the fibrous mass into the desired shape. In the second zone B, there is located at least one pair of opposed platens 18 and 20, each having a relatively broad surface area comprising plates 22 and 24 in opposed facing relationship. The lower platen 20 is mounted in fixed position on the support 26 while the upper platen 18 is mounted for movement toward and away from the platen 20 in the supporting mechanism 28. The broad surface areas of the opposed plates 22 and 24 are in substantially parallel relationship. The movement of the platen 18 toward and away from the platen 20 may be controlled by any conventional mechanism such as the adjusting screw 30 threadedly mounted in the support 28. The spacing of the platen 18 relative to the platen 20 governs the amount of compression applied to the fibrous material 2. Each platen 18 and 20 is provided with suitable means such as electric resistance heaters 32 to control the temperature of the plates 22 and 24 so as to provide sufficient heat to cure to a final stage substantially all of the resin in the fibrous material 2. The final curing of the binder in the instant invention is accomplished by raising the temperature of the binder by the heat produced through the platens 18 and 20 rather than by passing heated air through the fibrous mass as in other curing systems.

At the entrance 34 of the platens 18 and 20, each plate 22 and 24 is provided with a suitable tapered portion, 36 and 38, respectively, to facilitate the entry of the fibrous mass 2 between the platens. Immediately preceding the entrance 34, there is provided a pair of opposed rollers 40 and 42. The roller 42 is mounted for rotation in a pair of opposed bearing mounts secured to the support 26. The roller 40 is mounted for rotation in a pair of opposed bearing mounts 36 secured to the top platen 18. The bearing mounts for the roller 40 are spring loaded so that the roller 40 may move toward and away from the roller as the fibrous mass passes therebetween. The rollers 40 and 42 are positioned so that the outer surfaces thereof are spaced from each other under normal conditions, a distance less than the distance between the platens 22 and 24. Each roller 40 and 42 is mounted for free rotation and is so rotated by the forces applied to the outer surfaces thereof by the passage of the fibrous mass 2 therebetween. As the fibrous mass passes between the rollers 40 and 42, it is compressed thereby to facilitate entry of the fibrous mass between the plates 22 and 24. The fibrous mass 2 emerges from the exit portion 50 of the second zone B as a fibrous product 52 having a density substantially greater than the density of the mass of resin containing fibrous material 2 and having a given fixed shape.

The fibrous product 52 moves from the second zone B to a third zone C comprising means 54 for applying a pulling force to the fibrous product 52 which force functions to pull the fibrous mass 2 through each of the first and second zones A and B. The pulling means 54 in FIG. 1 comprises a lower conveyor belt trained over a pair of rollers 58 and 60 mounted for rotation in suitable opposed bearing mounts secured in fixed position in the support 62 attached to the base 64. The conveyor belt 56 is driven in the direction indicated by the arrow by a suitable mechanism such as a drive belt 66 connected to the variable speed motor 68 to rotate the rollers 60 and, therefore, drive the conveyor belt 56. An upper conveyor belt 70 is trained over a pair of rollers 72 and 74 for rotation in opposed bearing mounts 75 which are adjustably mounted in the slots 76 in the support 62. The rollers 72 and 74 including the conveyor belt 70 are moved toward and away from the conveyor belt 56 by any suitable mechanism such as the adjusting screw 78 threadedly mounted in the support 62. An idler roll 80 prevents sag of the conveyor belt 56 between the rollers 58 and 60 while the idler roll 82 assists in providing the proper pressure on the conveyor belt 70 between the rollers 72 and 74. The conveyor belt 70 is positioned relative to the conveyor belt 56 by the screw mechanism 78 so as to provide a proper amount of compression on the fibrous product 52 so that the desired pulling force may be applied to all surfaces of the fibrous product 52 contacted by the conveyor belts 56 and 70 so as to pull the fibrous mass 2 through the first and second zones A and B. The fibrous product 52 formed by the apparatus of FIG. 1 comprises a board-like product having a generally rectangular transverse cross-sectional configuration as illustrated in FIG. 1-A.

The production line, illustrated in FIG. 2, is generally similar to that illustrated in FIG. 1 except for the shape of the platen 20, the performing means adjacent the entrance 34 thereof, and the type of means 154 used to apply the pulling force to the finished product 84. The first zone A of FIG. 2 is the same as zone A of FIG. 1 as explained above. In the second zone B, the platen 18 is the same as that of FIG. 1, but the lower platen 120 comprises two L-shaped members 122 having surface plates 124 which members may be adjustably positioned by any conventional mechanism such as the screw means 125. The second zone B is further provided with a T-shaped forming member 130 which is secured to the support 126. The T-shaped forming member 130 has a body portion which extends in the direction of movement of the fibrous mass 2 a distance equal to the extent of the platens 18 and 120 and a leading portion which projects from the support 126 toward zone A. The platens 18 and 120 and the forming member 130 are provided with heating means such as the electric resisting heating elements 32 for providing a sufficient amount of heat to cure the resin in the resin containing fibrous mass 2 as it passes through zone B.

Immediately adjacent the entrance 34 of the platens 18 and 120, there are a plurality of rollers 132, 134 and 136 which cooperate with the leading portion of the T-shaped member 130 to impart a preformed shape to the fibrous mass 2 prior to its entry between the platens 18 and 120 and the body portion of the forming member 130. As illustrated in FIG. 4, the rollers 132, 134 and 136 are positioned to impart a generally T-shaped transverse cross-sectional configuration to the fibrous mass 2. The roller 132 is mounted for rotation in suitable bearing mounts in the supports 138 and, if desired, may be mounted for adjustment in a vertical plane by any suitable means. The rollers 134 are mounted for rotation in suitable bearing mounts secured in the supports 138. The rollers 136 are mounted for rotation in suitable bearing mounts in the supports 140 which supports may be adjusted toward and away from each other by suitable means in the base 144. The fibrous mass 2 emerges from the platens in zone B as a fibrous product 84 having a density substantially greater than the density of the resin containing fibrous mass 2 and having a given, fixed shape.

In zone C, there is illustrated the pulling means 154 for applying a pulling force to the fibrous product 84. The pulling means 154 functions similarly to the means 54 in FIG. 1 although the structure thereof is different. Pulling means 154 comprises a plurality of rollers 150, 152 and 153 for contacting the outer surfaces of the T-shaped fibrous product 84 to impart a pulling force thereto which pulling force functions to pull the fibrous mass 2 through the first and second zones A and B. The roller 150 is mounted for rotation in suitable bearing mounts which are adjustably mounted in spaced supports 156. The movement of the roller 150 toward and away from a pair of spaced rollers 152 may be controlled by any suitable means such as the screw mechanism 158. The rollers 152 are mounted in each of the supports 156 with their axes aligned and are positioned to contact the surfaces 164 on either side of the leg of the T-shaped fibrous product 84. At least one of the rollers 152 is driven through the belt 158 by the variable speed motor 160. A pair of rollers 153 are positioned to contact the opposite surfaces 162 of the leg of the T-shaped fibrous product 84 and are mounted in spaced bearing mounts in the support 164. At least one of the rollers 153 is driven through the belt and gear means 166 by the variable speed motor 168.

FIGS. 5—10, inclusive, are end views illustrating the transverse cross-sectional configuration of various fibrous products which may be made in accordance with the concepts of the instant invention. These fibrous products are formed by varying the physical characteristics of the platens and the forming rollers in the second zone B. Also, the pulling means in zone C is shaped to cooperate with the shape of the fibrous product. However, all changes of this nature to produce these fibrous products or fibrous products of any configuration formed from a mass of fibrous material, as explained above, are within the inventive concepts of the instant invention.

In operation of the apparatus disclosed in FIG. 1, a mass of fibrous material 2 containing resin is manufactured by conventional apparatus such as that disclosed in the aforementioned Labino patent and is fed to a location adjacent the first zone A. The movement of the fibrous mass through the first zone A is controlled by the pulling forces applied thereto by the pulling means in zone C. As the fibrous mass moves between the rollers 4 and 6, the heat from the outer surfaces thereof, which are at a temperature of approximately 500° F., advances the resin in the areas adjacent the surfaces of the fibrous mass to a partially cured stage so as to impart a degree of integrity and dimensional stability to the loose fibrous mass 2. Also, this partial curing imparts sufficient structural strength and coherency to the fibrous mass to enable it to withstand the pulling forces imparted thereto while in zones A and B by the pulling means in zone C with no detrimental effects on the body of fibrous material. The fibrous mass is then pulled between the rollers 40 and 42 where it is compressed to a thickness slightly less than the distance or thickness between plates 22 and 24 of the platens 18 and 20. After passing between the rollers 40 and 42, the fibrous mass 2 moves between the plates 22 and 24 where it is held to a fixed thickness while the resin contained therein is cured by the heat from the resistance heaters 32 acting through the plates 22 and 24. The heat and pressure applied to the fibrous mass 2 while between the plates 22 and 24 of the platens 18 and 20 functions to cure the resin in the fibrous mass and to form the loose fibrous mass into a permanent shape retaining fibrous product having a density substantially greater than the density of the fibrous mass and having the induced shape. In the apparatus of FIG. 1, the plates 22 and 24 are shaped to form the fibrous mass 2 into a fibrous product having a generally rectangular cross-sectional configuration. However, as explained above, the platens 18 and 20 can be shaped as desired to form fibrous products having any desired transverse cross-sectional configuration, such as those illustrated in FIGS. 2–A and 5–10, inclusive. Each of these configurations has at least two relatively broad surface areas, each of which has been contacted by a hot platen or forming member to provide a smooth, ironed surface. Also, in some instances it may be desirable to have additional curing means, such as additional units each comprising another pair of opposed platens 18 and 20, through which the fibrous mass would pass for additional curing and forming into a fibrous product prior to entering zone C.

Apparatus made in accordance with the inventive concepts of the instant application, particularly to FIG. 1, has been used to produce a board type fibrous product, such as the fibrous product 52 illustrated in FIG. 1–A, wherein the fibrous mass 2 comprises a loose body of glass fibers in the form of a continuous length of mat or blanket about 6 to 8 inches thick and containing throughout adhering to the fibers approximately 20% by weight of a phenol formaldehyde resin binder and having a density of about 0.3 pound/cubic foot so as to produce a fibrous product having a density of 3.0 pounds/cubic foot and a thickness of 1.0 inch. The temperature of the outer surface of the rollers 4 and 6 was approximately 500° F., and the temperature of the plates 22 and 24 of the platens 18 and 20 was approximately 550° F. The roller 4 was adjusted relative to the roller 6 so that the adjacent outer surfaces of the rollers 4 and 6 were spaced from each other a distance of about 1.0 inch. The platen 18 was adjusted relative to the platen 20 so that the surface of the plate 22 was spaced from the surface of the plate 24 a distance of about 1.0 inch. The rollers 40 and 42 were positioned relative to each other so that under normal conditions the distance between the adjacent outer surfaces was about 0.88 inch. Sufficient force was applied to the fibrous product 52 by the pulling means 54 so as to pull the fibrous mass 2 through the first and second zones A and B at a rate of about 3.0 feet/minute. The movement of the mass of fibrous material relative to the platen in the curing zone while in contact therewith results in an ironing of the surfaces of the fibrous material so as to produce a fibrous product having smooth, ironed upper and lower surfaces. In view of these smooth, ironed surfaces, a vinyl film having a thickness of about .002 inch may be applied to one surface of the fibrous product as it is manufactured to form perfectly flat and smooth panels. This is not possible with products formed by other processes because of flight marks, chain marks and the like imparted to the surfaces of the fibrous product during the curing of the resin binder therein. It is understood that the foregoing dimensions are given for illustration purposes only and that the invention is not to be limited thereto.

Another feature of the instant invention is the strength of the resin bond obtained at the junction of the compressed fibers during the cure of the resinous binder material. In conventional apparatus wherein the fibrous mass is carred through the curing ovens while compressed between flight conveyors, the inevitable movement and unsteadiness of the conveyors during their passage in the curing ovens is such that the amount of compression being applied to the fibrous material is repeatedly varied slightly above and below an average amount. The ever changing compression, even though very slightly, causes a slight movement of the fibers in the fibrous mass while the bonds are being formed by the setting of the binder and results in a slight looseness or weakening of the bond between the fibers and the resinous material at the junction of the fibers. In the instant invention, the platens, such as the platens 18 and 20, are in a fixed position so that a constant pressure is applied to the mass of fibrous material during the curing of the resin therein. The improvement obtained by the instant invention is noticeable in the flex strength of the fibrous products formed by the different processes. A plurality of 4-foot x 4-foot panels were formed on conventional apparatus and on apparatus of the type disclosed in the instant invention from a mass of glass fibers impregnated with 14% of a phenol formaldehyde resin binder which was cured in all instances to the same extent to form a fibrous product having a thickness of 2 inches and a density of 1.5 pounds/cubic foot. Each panel was supported on spaced parallel knife edges located one inch inside opposite parallel edges of the panel, and the sag of the fibrous product at the midpoint between the knife edges was measured. Those panels manufactured on conventional apparatus had an average sag of ½ inch while the same number of panels manufactured on apparatus of the instant invention had an average sag of only ¼ inch.

As is typical in the formation of low density fibrous products, it should be appreciated that primarily attributable to the high degree of resiliency of some inorganic fibrous materials such as glass, the very low density of bodies of some fibrous felts and the extensive degree of compression thereof and reduction in thickness or other dimension, and the relatively low proportion of binder with the resulting discontinuous binder phase and openness of the structure whereby the fibers united substantially only at junctions therebetween are extensively bent, there may be a slight degree of recovery or expansion of the finished product in the compressed dimensions from that imparted during compression and shaping. This however is not critical because the recovery or expansion is essentially uniform over a given dimension and does not affect or disrupt the smoothed surfaces whereby it may be easily compensated for simply by over consolidating and densifying in degree to offset this common effect, as for example in the specific embodiment beginning in column 7 of the specification.

While the invention has been described in rather full detail, it will be understood that these details need not be strictly adhered to and that various changes and modifications may suggest themselves to one skilled in the

What we claim is:

1. Apparatus for consolidating, shaping and curing bonded fibrous products formed from low density masses of fiber containing binder throughout, comprising the combination of means in the following given sequence of:
   (a) first means for compressing a moving body of low density mass of fiber containing binder throughout and for heating the compressed surfaces of said mass of fiber to thermally advance the cure of the binder contained therein in the area adjacent the compressed surfaces,
   (b) second means following said first means comprising a pair of fixed platens providing stationary skid plates for further compressing and shaping the moving mass of fibers containing binder throughout in sliding contact therewith to consolidate and conform the mass of fibers to the designed product density and configuration, for smoothing the compressed surfaces in sliding contact therewith and for heating the compressed surfaces to substantially complete the cure of the binder throughout the compressed and shaped mass of fibers fixing the imparted product density and configuration, and
   (c) means comprising pulling assembly for applying a pulling force upon the shaped and bonded product emerging from the said preceding first and second means to move the mass of fibers containing binder throughout sequentially through the said first and second means.

2. Apparatus for consolidating, shaping and curing bonded fibrous products formed from low density masses of fiber containing binder throughout, comprising the combination of means in the following sequence of:
   (a) first rotatable means for compressing a moving body of low density mass of fibers containing binder throughout passing thereby and for heating the compressed surfaces of said mass of fiber to thermally advance the cure of the binder contained therein in the area adjacent the compressed surfaces,
   (b) second means following said first means comprising a pair of heated opposed platens forming stationary skid plates for contact with the moving mass of fiber containing binder throughout with their heated surfaces substantially parallel and in contact with the moving mass of fiber containing binder throughout for compressing and shaping the said moving mass of fibers containing binder throughout to consolidate and conform the mass of fibers to the designed product density and configuration, for smoothing the compressed surfaces by moving in sliding contact with the stationary skid plates of the heated plater and for heating the compressed surfaces by contact with the heated opposed platen to substantially complete the cure of the binder throughout the compressed and shaped mass of fibers fixing the imparted product density and configuration, and
   (c) means comprising a pulling assembly for applying a pulling force upon the shaped and bonded product emerging from the said preceding first and second means to move the mass of fibers containing binder throughout sequentially through the said first and second means.

3. The apparatus of claim 2 wherein the first means for compressing the moving body of low density mass of fibers containing binder throughout and for heating the compressed surfaces of said mass of fiber to thermally advance the cure of the binder contained therein in the area adjacent the compressed surfaces comprises a pair of heated, opposed rollers.

4. The apparatus of claim 3 wherein the means for pulling the shaped and cured product emerging from the said first and second means to move the mass of fibers containing binder throughout sequentially through the said first and second means comprises a cooperating pair of opposed conveyor driving belts positioned in parallel to frictionally grip intermediate the parallel driving belts and pull the shaped and cured product emerging from the said first and second means.

5. The apparatus of claim 4 wherein the pair of heated opposed platens have substantially parallel heated surfaces providing skid plates which are stationary, imperforate and substantially smooth planes.

6. Apparatus of claim 5 wherein said second means comprising a pair of heated opposed platens with their heated surfaces substantially parallel additionally include cooperating therewith shape imparting forming means.

References Cited

UNITED STATES PATENTS

| | | | |
|---|---|---|---|
| 2,167,440 | 7/1939 | Mason. | |
| 2,310,748 | 2/1943 | Pearson. | |
| 2,752,279 | 6/1956 | Alderfer. | |
| 2,760,228 | 8/1956 | Verges. | |
| 2,909,804 | 10/1959 | Means | 18—4 |
| 2,931,063 | 5/1960 | Harris | 18—4X |
| 3,070,476 | 12/1962 | Miller. | |
| 3,103,410 | 9/1963 | Dobbins | 18—4X |
| 3,230,287 | 1/1966 | Caron et al. | 18—4X |
| 3,271,485 | 9/1966 | Canfield | 18—4X |
| 3,475,522 | 10/1969 | Garbian et al. | 18—4X |

J. SPENCER OVERHOLSER, Primary Examiner

R. L. SPICER, Jr., Assistant Examiner

U.S. Cl. X.R.

18—15